Oct. 25, 1955   H. C. GEER ET AL   2,721,620
AIR-REMOVER
Filed Oct. 18, 1952
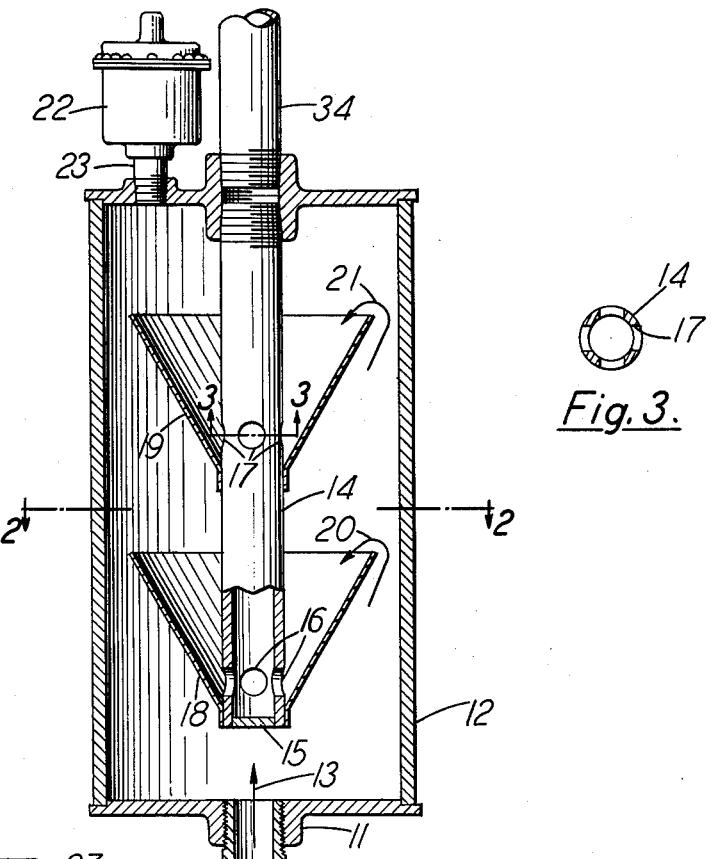
Fig. 1.
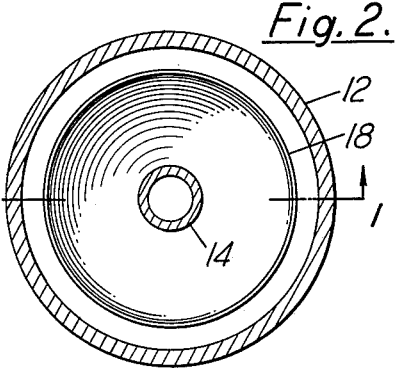
Fig. 3.
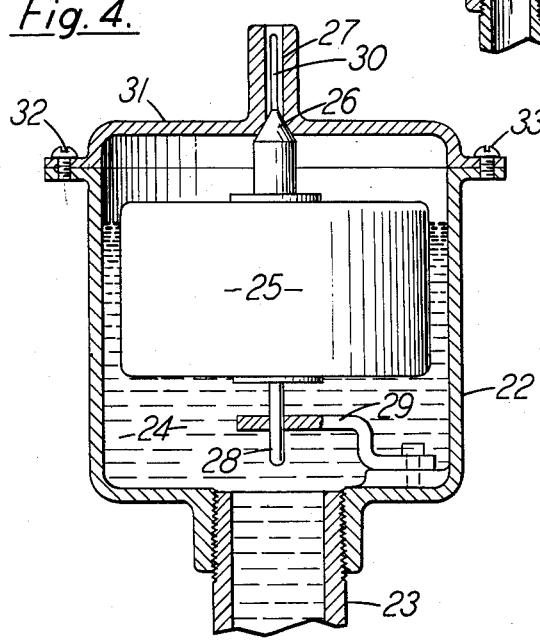
Fig. 4.
Fig. 2.
Inventors
Harold C. Geer
Glenn D. Wiggers
BY
Glenn B. Morse
Attorney United States Patent Office 2,721,620
Patented Oct. 25, 1955

2,721,620
AIR-REMOVER

Harold C. Geer and Glenn D. Wiggers, Grand Rapids, Mich.

Application October 18, 1952, Serial No. 315,584

6 Claims. (Cl. 183—2.5)

The present invention provides a device for removing the entrained air from fluid flowing through a conduit. This device has been developed primarily for use in conjunction with hot water heating systems, in which the presence of air in the lines creates a very well-known problem. The present invention provides a device of very simple construction capable of continually removing entrained air from a line without seriously impeding the flow of the fluid therein.

In the preferred form of the invention, an elongated chamber is connected to the conduit, with the axis of the chamber substantially vertical. The axis of the conduit at the point of entry into the chamber is also preferably vertical. An internal conduit is arranged within the chamber, with the lower end plugged off. A series of groups of perforations is provided in the wall of the internal conduit, and the entire flow from the exterior conduit through the device must pass inwardly through these perforations and along the interior conduit to the point of outlet. A substantially conical baffle is connected to the interior conduit adjacent to and just below each group of these perforations. These baffles extend upwardly and outwardly, and force the flow of fluid to follow a downward pattern before entering the interior conduit and passing out of the device. The entrained air has a considerable resistance against following the downward path, and tends to become separated from the flow of fluid at the upper extremities of the conical baffles. Such air tends to move on upwardly toward the top of the chamber, where it is released to the atmosphere through a float-controlled valve.

The several features of the present invention will be discussed in detail through an analysis of the particular embodiments illustrated in the accompanying drawing. In the drawing, Figure 1 shows a sectional view in elevation along the axis of a device embodying the present invention.

Figure 2 is a section taken on plane 2—2 of Figure 1.

Figure 3 is a section taken on the plane 3—3 of Figure 1.

Figure 4 is an enlarged view showing a cross-section of a float-operated valve used in the device illustrated in Figure 1.

Referring to Figure 1, a conduit 10 is shown connected to the inlet fitting 11 of the chamber 12. Fluid enters through the conduit 10 in the direction of the arrow 13. An interior conduit 14 is positioned inside the chamber 12, and the lower end of the interior conduit 14 is stopped with a plug 15. Groups of perforations 16 and 17 are formed in the wall of the interior conduit 14, and the conical baffles 18 and 19 are mounted on the interior conduit at points just below the perofrations 16 and 17, respectively. These baffles may be considered as concave toward the upper end of the chamber 12 and they extend outwardly and along the interior conduit 14 opposite the perforations. Fluid entering through the conduit 10 moves upwardly from the point of entry, and is forced to follow paths as indicated by the arrows 20 and 21. At the point where the flow begins to turn downwardly to enter the perforations 16 and 17, the entrained air tends to break away from the flow pattern and move upwardly within the chamber 12. Such air accumulates in the upper portion, and finds its way into the float-operated valve unit 22. This unit is mounted on the connector 23 which establishes communication between the interior of the valve structure and the upper portion of the chamber 12.

Referring ot Figure 4, air accumulating in the upper portion of the chamber 12 moves upwardly due to its buoyancy through the connector 23, and into the float chamber 24. The air accumulates at the uppermost part of the chamber, and the float 25 is positioned by the relative amount of air and fluid within the chamber 24. As the amount of air increases within the float chamber 24, the float will no longer maintain the closure of the valve 26, and air will be exhausted through the passage 27. The valve structure includes a lower stabilizing projection 28 which cooperates with a locating member 29 to maintain the relative position of the float and the valve unit within the chamber 24. At the opposite end of the valve-float assembly, an extension 30 cooperates with the passage 27 to complete the radial location of this assembly. Preferably, the valve chamber is formed with a removable cover as indicated at 31 which is held in position by screws as indicated at 32 and 33.

The outlet pipe 34 is connected to the upper end of the chamber 12, and is in communication with the interior conduit 14. Fluid emerging from the unit through the outlet conduit 34 will be substantially free from entrained air.

The particular embodiments of the present invention which have been shown and discussed herein are for illustrative purposes only, and are not to be considered as a limitation upon the scope of the appended claims. In these claims, it is our intention to claim the entire invention disclosed herein, except as we are limited by the prior art.

We claim:

1. A device for removing entrained air from fluid flowing in a conduit, comprising: means forming a chamber; inlet means in the bottom of said chamber and adapted for connection to said conduit, said conduit entering said inlet means on a substantially vertical axis; internal conduit means disposed within said chamber substantially coaxially with said conduit means, said internal conduit means carrying substantially the entire flow of liquid entering said chamber and having the lower end thereof closed, and having groups of perforations in the wall thereof; substantially conical baffle means secured to said internal conduit means at points adjacent and below said groups of perforations, and extending upwardly and outwardly from said internal conduit means opposite said groups of perforations; outlet means communicating with said internal conduit means; and air-release means including float-operated valve means communicating with the upper portion of said chamber means.

2. A device for removing entrained air from fluid flowing in a conduit, comprising: means forming a chamber; inlet means in the bottom of said chamber and adapted for connection to said conduit, said conduit entering said inlet means on a substantially vertical axis; internal conduit means disposed within said chamber substantially coaxially with said conduit means, said internal conduit means carrying substantially the entire flow of liquid entering said chamber and having the lower end thereof closed, and having groups of perforations in the wall thereof; substantially conical baffle means secured to said internal conduit means at points adjacent and below said groups of perforations, and extending upwardly and outwardly from said internal conduit opposite said groups of perforations; outlet means communicating with said internal conduit means; and air-release means communicating with the upper portion of said chamber means.

3. A device for removing entrained air from fluid flowing in a conduit, comprising: means forming a chamber; inlet means in the bottom of said chamber and adapted for connection to said conduit; internal conduit means disposed within said chamber, said internal conduit means carrying substantially the entire flow of liquid entering said chamber and having the lower end thereof closed, and having groups of perforations in the wall thereof; baffle means secured to said internal conduit means at points adjacent and below said groups of perforations, and extending upwardly and outwardly from said internal conduit opposite said groups of perforations; outlet means communicating with said internal conduit means; and air-release means communicating with the upper portion of said chamber means.

4. A device for removing entrained air from fluid flowing in a conduit, comprising: means forming a chamber; inlet means in one end of said chamber adapted for connection to said conduit; internal conduit means disposed within said chamber and extending toward the opposite end of said chamber from said inlet means, said internal conduit means carrying substantially the entire flow of liquid entering said chamber and having the end thereof adjacent said inlet means closed, and also having perforations in the wall thereof; baffle means secured to said internal conduit means and extending outwardly from and along said internal conduit means opposite said perforations; outlet means communicating with said internal conduit means; and air-release means communicating with the end of said chamber means opposite from said inlet means.

5. A device for removing entrained air from fluid flowing in a conduit, comprising: means forming a chamber; inlet means in said chamber adapted for connection to said conduit; internal conduit means disposed within said chamber and extending toward the opposite end of said chamber from said inlet means, said internal conduit means carrying substantially the entire flow of liquid entering said chamber and having inlet means; means secured with respect to said internal conduit means, and extending outwardly from and along said internal conduit opposite said internal conduit inlet means; outlet means communicating with said internal conduit means; and air-release means communicating with the end of said chamber means opposite from said inlet means.

6. A device for removing entrained air from fluid flowing in a conduit, comprising: means forming a chamber; inlet means in said chamber adapted for connection to said conduit; internal conduit means disposed within said chamber, said internal conduit means carrying substantially the entire flow of liquid entering said chamber and having inlet means; baffle means secured with respect to said internal conduit means and extending outwardly from and along said internal conduit opposite said internal conduit inlet means; outlet means communicating with said internal conduit means; and air-release means communicating with the end of said chamber means on the concave side of said baffle means.

References Cited in the file of this patent

UNITED STATES PATENTS

| | | |
|---|---|---|
| 1,452,253 | Nevitt | Apr. 17, 1923 |
| 1,857,887 | Stein | May 10, 1932 |
| 2,228,401 | Pressler | Jan. 14, 1941 |
| 2,575,568 | Topanelian | Nov. 20, 1951 |

FOREIGN PATENTS

| | | |
|---|---|---|
| 174,352 | Germany | Aug. 4, 1906 |